United States Patent
Hudson et al.

(10) Patent No.: US 9,292,359 B2
(45) Date of Patent: Mar. 22, 2016

(54) SYSTEM AND METHOD FOR MEMORY MANAGEMENT

(75) Inventors: Richard Hudson, Florence, MA (US); Stephan A. Herhut, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 13/560,054

(22) Filed: Jul. 27, 2012

(65) Prior Publication Data

US 2014/0033213 A1     Jan. 30, 2014

(51) Int. Cl.
*G06F 9/46*     (2006.01)
*G06F 9/54*     (2006.01)
*G06F 9/50*     (2006.01)
*G06F 12/02*    (2006.01)

(52) U.S. Cl.
CPC .............. *G06F 9/54* (2013.01); *G06F 9/5016* (2013.01); *G06F 12/0253* (2013.01); *G06F 2209/5011* (2013.01)

(58) Field of Classification Search
None
See application file for complete search history.

(56) References Cited

U.S. PATENT DOCUMENTS

| | | | |
|---|---|---|---|
| 7,552,153 B2 | 6/2009 | Dostert et al. | |
| 8,336,056 B1 * | 12/2012 | Gadir | 718/104 |
| 2008/0021939 A1 | 1/2008 | Dahlstedt et al. | |
| 2009/0172337 A1 * | 7/2009 | Van Riel et al. | 711/170 |
| 2011/0252216 A1 | 10/2011 | Ylonen et al. | |

OTHER PUBLICATIONS

Oracle JRockit JVM, Section Understanding Memory Management, Oracle, 2009.*
Erbad, et al., "DOHA: Scalable Real-time Web Applications Through Adaptive Concurrent Execution", In: Proceedings of the 21st International conference on World Wide Web, Apr. 16-20, 2012, pp. 161-170.
Mehrara, et al., "Dynamic Parallelization of JavaScript Applications Using an Ultra-lightweight Speculation Mechanism", In: Proceedings of the 17th International Symposium on High-Performance Computer Architecture, Feb. 12-16, 2011, 12 pages.
International Search Report and Written Opinion received for PCT Patent Application No. PCT/US2013/051823, mailed on Nov. 25, 2013, 12 Pages.
International Search Report and Written Opinion received for PCT Patent Application No. PCT/US2013/051823, mailed on Feb. 5, 2015, 10 pages.

(Continued)

*Primary Examiner* — Mengyao Zhe
(74) *Attorney, Agent, or Firm* — Grossman, Tucker, Perreault & Pfleger, PLLC

(57) ABSTRACT

A system and method for automatic memory management of a shared memory during parallel processing of a web application. The system includes a computing system configured to allow parallel computing of a web application executed within a web browser. The computing system includes shared memory having a set of blocks distributed at least a first thread and at least one spawned thread of a processing function of the web application. The memory is partitioned into a nursery heap, a mature heap and a database having a plurality of private nurseries, wherein the first thread has access to the nursery heap and mature heap and the at least one spawned thread has access to an associated one of the plurality of private nurseries. During parallel computing of the web application, management of the shared memory includes garbage collection of at least each of the plurality of private nurseries.

21 Claims, 4 Drawing Sheets

(56) References Cited

OTHER PUBLICATIONS

Patent Examination Report No. 1 received for Australian Application No. 2013295854, mailed on Jun. 12, 2015, 3 pages.

Japan Office Action from related case JP2015-503691 mailed Oct. 27, 2015.

* cited by examiner

SYSTEM AND METHOD FOR MEMORY MANAGEMENT

FIELD

The present disclosure relates to memory management, and, more particularly, to a system and method for automatic memory management of a shared memory during parallel processing of an in-browser web application.

BACKGROUND

Parallel processing (also referred to herein as "parallel computing") is a form of computation in which many calculations are carried out simultaneously, operating on the principle that large problems can often be divided into smaller ones, which are then solved concurrently ("in parallel"). As power consumption (and consequently heat generation) by computers has become a concern in recent years, parallel computing has become a dominant paradigm in computer architecture, mainly in the form of modern processors, such as multi-core processors. As generally understood, a multi-core processor is a single computing component with two or more independent central processing unit (CPU) cores that read and execute program instructions. The multiple cores can issue multiple instructions per cycle from multiple instruction streams, increasing overall speed for programs amenable to parallel computing. Accordingly, parallel processing on a multi-core processor may generally include the simultaneous use of more than one core to execute a program and/or multiple computational threads.

Parallel processing has generally been applied to native applications (e.g., a locally installed application designed to run in the computer environment (machine language and OS) it is being run in). It has become increasingly common for users to access and work with web applications within the web browser. A web application must generally leverage all available computing resources to provide the best possible user experience. However, web applications do not necessarily take full advantage of parallel client hardware due to a lack of appropriate programming models. ECMAScript, the scripting language standardized by Ecma International, is a scripting language widely used for client-side scripting on the web, in the form of several well-known dialects, such as JavaScript®, JScript® and ActionScript®. JavaScript®, for example, is a popular scripting language for manipulating HTML documents in web browsers and adopted in a variety of web applications, is generally limited to sequential execution due to lack of appropriate programming models. As such, data-parallelism has generally not been achievable in web applications.

BRIEF DESCRIPTION OF DRAWINGS

Features and advantages of the claimed subject matter will be apparent from the following detailed description of embodiments consistent therewith, which description should be considered with reference to the accompanying drawings, wherein:

Figure 1:
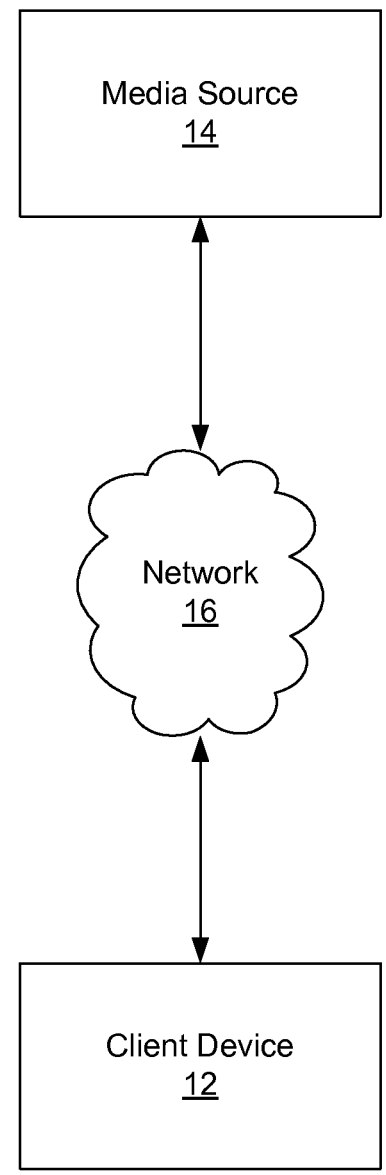
FIG. 1 is a block diagram illustrating one embodiment of a system for management of shared memory during parallel computing of an in-browser web application consistent with various embodiments of the present disclosure.

Although the following Detailed Description will proceed with reference being made to illustrative embodiments, many alternatives, modifications, and variations thereof will be apparent to those skilled in the art.

DETAILED DESCRIPTION

By way of overview, the present disclosure is generally directed to a system and method for automatic memory management for parallel computing of an in-browser web application. A system and method consistent with the present disclosure may be used in conjunction with a deterministic parallel programming model configured to enable data-parallelism for in-browser web applications. A deterministic parallel programming model may be configured to enable data-parallelism for in-browser web applications by leveraging the CPU cores and vector instructions of a multi-core processor within the boundaries of the familiar JavaScript programming paradigm. More specifically, the deterministic parallel programming model may be configured to extend JavaScript with deterministic data-parallel constructs translated at runtime into a low-level hardware abstractions layer to achieve a substantial increase in speed over sequential execution JavaScript. Accordingly, the extension of JavaScript with the deterministic parallel programming model may allow more compute-intensive applications, such as, for example, photo editing and video games, to be accessed while in the web browser, which may be useful for productivity programmers, particularly web application programmers working in JavaScript.

During parallel processing of an application on a multi-core processor, two or more CPU cores each carry out one or more processes (programs or sets of instructions) in tandem, wherein a process may execute one or more threads, each thread representing a single path of execution through the application's code. Two or more of the threads of an application may be able to execute at the same time, with each CPU core running a particular thread. It is common for threads of an application to share resources during concurrent execution, such as, for example, memory. Concurrent execution may refer to the simultaneous execution of two or more threads of an application. Shared memory may be an efficient means of passing data.

As a result of extending JavaScript with a deterministic parallel programming model as described earlier, JavaScript may adopt shared memory concurrency constructs. One challenge associated with shared memory is ensuring the correct sequencing of the interactions or communications between different computational executions, and coordinating access to the memory shared among executions. Under some common software development models, software developers spend a substantial amount of time identifying and attempting to correctly synchronize parallel threads within applications. For example, a developer may explicitly use locks, semaphores, barriers, or other synchronization mechanisms to control access to a shared memory. Generally, when a thread accesses the shared memory, the synchronization mechanism prevents other threads from accessing the shared memory by suspending those threads until the resource becomes available.

Some deterministic parallel programming models for extending JavaScript, as previously described, allow execution of an in-browser web application in a deterministic runtime execution environment, thereby addressing synchronizing issues with shared memory constructs. The term "deterministic" generally refers to the ability to predict or specify the behavior of a program or environment. The deterministic multiprocessing and execution of an in-browser web application may ease the burden on web application programmers of having to synchronize thread accesses to shared memory. However, in order to ensure deterministic multiprocessing, access to shared memory is limited and restricted to being read only whenever a thread is running concurrently, as some deterministic parallel programming models add a read only data structure to JavaScript.

Current deterministic parallel programming models for extending JavaScript may place strains on management of shared memory. For example, in a computing system, data may be stored in the form of "objects" that are allocated space in a portion of the shared memory. In many computer environments, objects are created, or "allocated", dynamically (i.e., on an as-needed basis) during the execution of a program or application. In addition, given that the amount of memory available in a computer is limited, some mechanism for removing, or "deallocating", unused objects is also provided, typically either through the use of specific program instructions or through an automated process known as garbage collection.

The primary drawback to dynamic memory management, however, is the additional "overhead" that is associated with both allocating and deallocating objects. Allocating and deallocating an object each require the computer to perform certain operations that may be outside of the actual productive operations that are being performed during execution of a program or application, thereby delaying the performance of the productive operations. Additionally, dynamic memory management may also result in "immutable" objects (e.g., objects that cannot be modified after they are created). The creation, and later deallocation, of large numbers of redundant immutable objects decreases available storage and introduces processing overhead, both of which decrease performance. As such, with current deterministic parallel programming models, tension may exist between optimizations made available by having immutable objects, which require little or no coherence between copies, and pressures placed on memory management due to the inability to mutate and reuse objects already allocated.

A system and method consistent with the present disclosure is configured to provide management of a shared memory for use during parallel processing of an in-browser web application on a computing system of a client device. The system includes a memory management module configured to monitor the in-browser web application thread execution and manage life cycles of objects allocated and stored within the shared memory related to the thread execution. The shared memory heap may be partitioned to include a nursery heap and a mature heap (e.g., a global area) and a database having a plurality of private nurseries (e.g., local area). During execution of one or more spawned threads of the web application, each spawned thread is provided access to a corresponding empty private nursery in which to allocate and manipulate objects.

In the event that a spawned thread runs out of available space in an associated private nursery and requires additional memory space, the spawned thread may gain access to a separate private nursery having a portion of unused memory space (e.g., a partially used private nursery) available in order to complete allocation requirements. In the event that a partially used private nursery is not available, the spawned thread remains dormant at least until another spawned thread completes execution and provides a partially used private nursery or until all non-completed spawned threads are dormant at an allocation. The utilization of partially used memory provides a more efficient and less wasteful means of thread execution, as memory space in a system may be limited.

The memory management module further includes a garbage collector module configured to provide garbage collection of the global and local areas of the shared memory during one or more garbage collection cycles. The one or more garbage collection cycles are based on a safe point scheme, wherein each spawned thread may reach a safe point (e.g., a point in the spawned thread's execution in which garbage collection is safe) determined by the spawned thread's state of execution (e.g., running, dormant, complete). According to the safe point scheme, if a spawned thread is running, then the system is making progress and the spawned thread has not reached a safe point. If a spawned thread is dormant or has completed execution, then the spawned thread has reached a safe point. In order for a garbage collection cycle to initiate, all spawned threads may reach a safe point (e.g., each spawned thread must be dormant or complete) and if one of the spawned threads is running, then garbage collection will not occur. The safe point scheme allows a minimal set of safe points in order to allow garbage collection and provides that the garbage collection will not interfere with progress of system as a whole.

Turning to FIG. 1, one embodiment of a system 10 consistent with the present disclosure is generally illustrated. The system 10 includes a client device 10 configured to communicate with a media source 14 via a network 16. The client device 12 may include, but is not limited to, a personal computer (PC), netbook, tablet, smart phone, portable digital assistant (PDA), portable media player (PMP), and mobile phone, and other computing device.

The client device 12 may be configured to access content provided by the media source 14 via the network 16. The network 16 may be any network that carries data. Non-limiting examples of suitable networks that may be used as network 16 include the internet, private networks, virtual private networks (VPN), public switch telephone networks (PSTN), integrated services digital networks (ISDN), digital subscriber link networks (DSL), wireless data networks (e.g., cellular phone networks), other networks capable of carrying data, and combinations thereof. In some embodiments, network 16 is chosen from the internet, at least one wireless network, at least one cellular telephone network, and combinations thereof. Without limitation, network 16 is preferably the internet. The media source 14 may include, but is not limited to, public and private websites, social networking websites, audio and/or video websites, combinations thereof, and the like that may provide content, such as, for example, web applications, executable on the client device 12.

Figure 2:
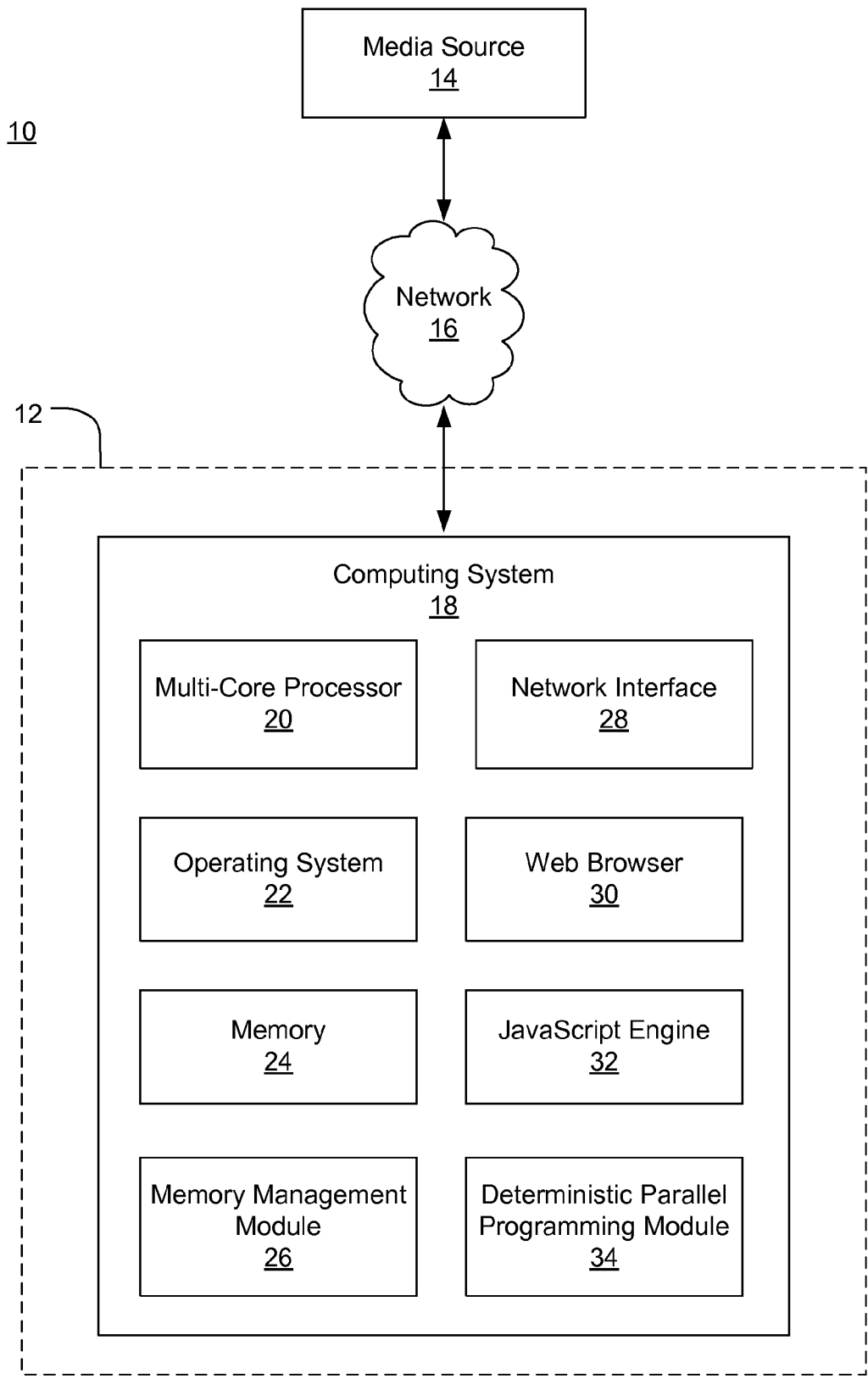
FIG. 2 is a block diagram illustrating one embodiment of a client device of the system of FIG. 1 in greater detail.

Turning now to FIG. 2, a block diagram of the system 10 of FIG. 1 in greater detail is generally illustrated. As shown, the client device 12 may includes a computing system 18. The computing system 18 may include a multi-core processor 20, an operating system 22, memory 24, a memory management module 26, a network interface 28, a web browser 30, a programming language engine (e.g., JavaScript Engine 32), and a deterministic parallel programming module 34.

The multi-core processor 20 may be configured to process instructions, perform calculations and manage the flow of information through the computing system 18. As generally understood, the multi-core processor 20 may include multiple central processing unit (CPU) cores configured to read and execute program instructions. The operating system 22 may be configured to run on the multi-core processor 20 and utilize memory 24 to store data. The operating system 22 may be configured to manage resources, such as data stored in memory 24, schedule tasks, and process operation of the memory management module 28, as described in greater detail herein. Additionally, the operating system 22 may also be configured to manage other tasks of the computing system 18 in a manner well known to those of ordinary skill in the art. A system consistent with the present disclosure may include any known operating system 22.

As may be appreciated, the operating system 22 may include any known hardware and/or software configured to perform scheduling. For example, in one embodiment, the operating system 22 may include a scheduler (not shown). As generally understood, scheduling is the method by which threads, processes or data flows are given access to system resources (e.g. processor time, communications bandwidth). A process (e.g. application) in an operating system 22 may include one or more threads, each of which represents a single path of execution through the application's code. The scheduler may include instructions and/or logic that assign threads to corresponding CPU cores of the multi-core processor 20 and schedule threads to execute on the corresponding CPU cores.

During the execution of one or more threads of an application, the memory 24 may be managed by the memory management module 26. More specifically, the memory management module 26 may be configured to monitor thread execution and manage life cycles of objects allocated and stored within the memory 24, freeing up vital memory space by removing unused objects, as described in greater detail herein.

The network interface 26 may be configured to allow the client device 12 to communicate and exchange information with the media source 14 via the network 16. For example, in one embodiment, a user may access a web application from the media source 14 for execution on the client device 12. A web application may generally refer to a computer software application coded in a browser-supported language, such as, for example, JavaScript, combined with a browser-rendered markup language, such as HTML. The web application may be browser-based, such that the web application may be reliant on a web browser to render the application executable. It should be noted that a system and method consistent with the present disclosure are not limited to use with the JavaScript programming language and that other embodiments consistent with the present disclosure may be implemented with other known computer programming languages.

The web browser 30 is configured to enable a user of the client device 12 to access, retrieve and view documents and other resources on the internet. As generally understood, the web browser 30 may include a software application for retrieving, presenting, and traversing information resources from the media source 14, particularly the World Wide Web. In the illustrated embodiment, the web browser 30 is configured to execute a web application from the media source 14 and allow the user to access and interact with content (e.g., text, images, and other information) related to the web application. In one embodiment, the web browser may include Firefox® offered by Mozilla Corporation. It should be noted that the web browser may include any other known web browsers, including, but not limited to, Internet Explorer®, Opera®, Netscape®, and Safari®.

The JavaScript engine 32 is configured to interpret and execute web application code (e.g. web application is coded in JavaScript) within a runtime system of the web browser 30. As generally understood, the JavaScript engine 32 may include computer software configured to interpret and execute JavaScript. The execution of the web application code may occur within the web browser 30 or some other client-side program. The JavaScript engine 32 may include any known JavaScript engine compatible with the web browser 30. For example, in one embodiment, the JavaScript engine 32 may be compatible with some or all versions of Firefox web browser 30.

The deterministic parallel programming module 34 may be configured to enable data-parallelism for the in-browser web application. More specifically, the deterministic parallel programming module 34 may be configured to extend JavaScript with deterministic data-parallel constructs translated at runtime into a low-level hardware abstractions layer. The deterministic parallel programming module 34 is configured to operate in conjunction with the JavaScript engine 32 so as to allow parallel processing of the in-browser web application by leveraging at least the multiple CPU cores and/or vector instructions of the multi-core processor 20. As such, the deterministic parallel programming module 34 may be configured to modify the JavaScript engine 32, wherein, at runtime, the modified JavaScript engine 32 is configured to automatically discover and adapt to any parallel-processing resources available. For example, the modified JavaScript engine 32 may be configured to utilize a CPU's vector-arithmetic instructions, the multiple CPU cores, multiple threads per core and/or multiple processors of a system.

Figure 3:
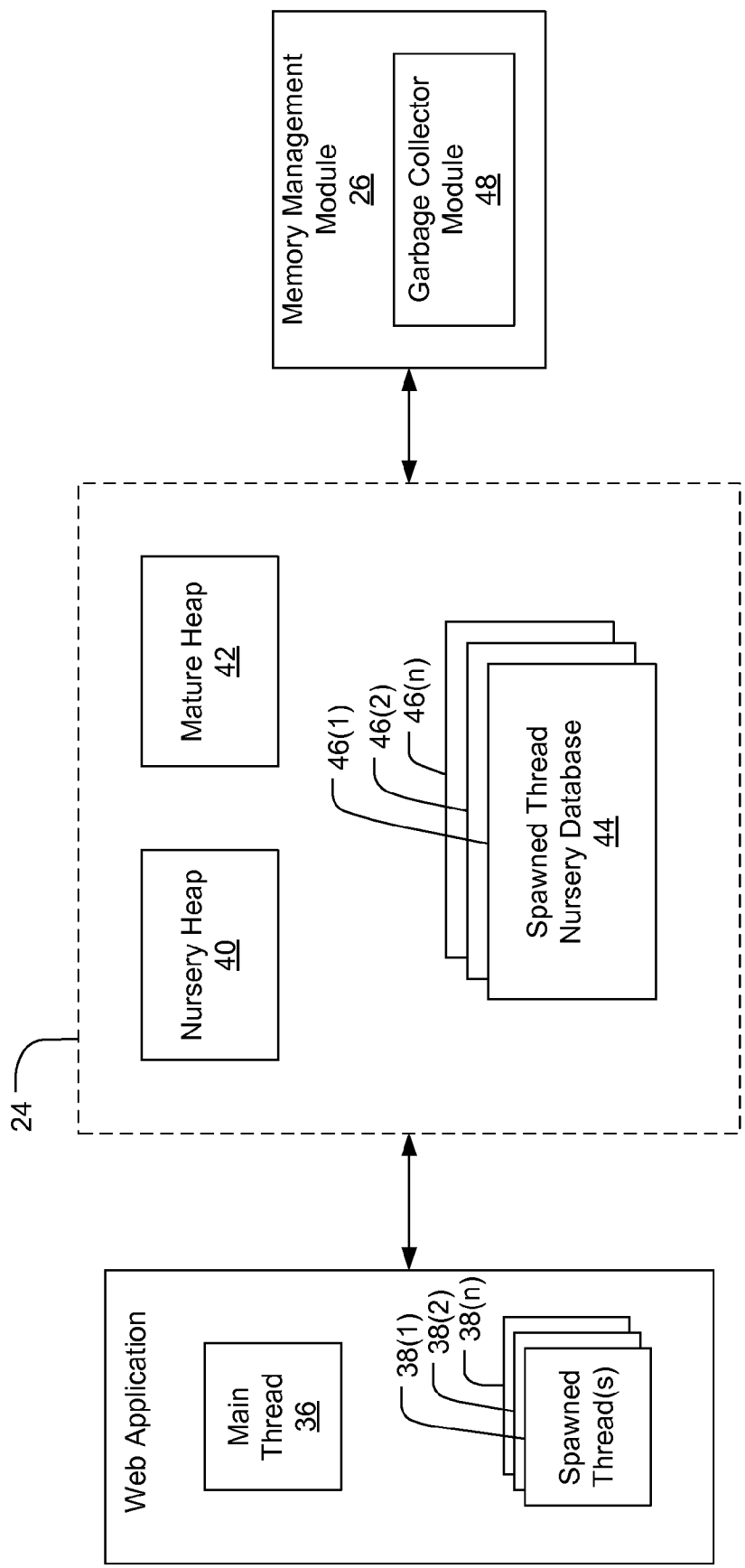
FIG. 3 is a block diagram illustrating one embodiment of a memory management module and shared memory consistent with various embodiments of the present disclosure.

Turning to FIG. 3, a block diagram of one embodiment of a memory management module 26 and memory 24 consistent with various embodiments of the present disclosure is generally illustrated. As previously described herein, the operating system 22 may include a scheduler configured to assign threads to corresponding CPU cores of the multi-core processor 20 and schedule threads to execute on the corresponding CPU cores. Accordingly, consistent with one embodiment of the present disclosure, one or more processing functions of the in-browser web application may be portioned into a number of threads, wherein each thread may be scheduled by the scheduler for execution on a corresponding CPU core of the multi-core processor 20.

The web application may generally start with a single thread (e.g. main thread 36) which may run the web application's main function. The web application may spawn additional threads (e.g. spawned threads 38(1)-38(n)), each of which executes the code of a specific function. Each of the spawned threads 38(1)-38(n) becomes an independent entity inside of the web application's process space. As generally understood by one skilled in the art, each thread may include an execution stack (not shown) and may be scheduled for runtime separately by a kernel (not shown). As previously described, modifying the JavaScript engine 32 with the deterministic parallel programming module 34 enables data-parallelism of the web application. Accordingly, some of the threads of the web application may each be able to execute concurrently on separate associated CPU cores.

In the illustrated embodiment, the threads (main thread 36 and spawned threads 38(1)-38(n)) share the memory 24. More specifically, a set of blocks or contiguous areas of memory may be distributed to the threads for execution. As shown, heap space of the memory 24 may be partitioned into at least a nursery heap 40 and a mature heap 42. The nursery heap 40 may include a small area of memory where new objects are created (e.g. allocated) and stored for a relatively short period of time (e.g., seconds). Generally, objects stored in the nursery heap 40 generally have low life expectancy. The mature heap 42 may include a relatively large area of memory where objects may live until no longer useful. The memory 24 may further include a spawned thread nursery database 44 having private nurseries 46(1)-46(n) stored within. Generally, during execution, the distinguished main thread 36 may allocate one or more objects in the nursery heap 40 and write references to one or more objects stored in the nursery heap 40 as well as the mature heap 42. Each of the spawned threads 38(1)-38(n) may have access to an associated private nursery 46(1)-46(n) of the spawned thread nursery database 44. More specifically, when a thread is spawned, the spawned thread is provided access to a corresponding empty private nursery in which to allocate and manipulate objects. The spawned threads 38(1)-38(n) are allowed to read the nursery heap 40 and mature heap 42 but are not allowed to write into either the nursery heap 40 or the mature heap 42.

As previously described, the memory management module 26 is configured to monitor thread execution and manage life cycles of objects allocated and stored within the memory 24. The memory management module 26 may include, for example, a garbage collector module 48 configured to perform garbage collection. Garbage collection may refer to an automatic form of memory management configured to reclaim resources, such as, for example, memory, used by data objects that will not be accessed or manipulated again by a subject application program. Accordingly, the garbage collection module 48 may be configured to deallocate unused objects in the memory 24 in order to free up vital memory space for new object allocations.

The garbage collection module 48 may be configured to determine which data objects in the web application will not be accessed in the future and reclaim the resources used by those objects. More specifically, the garbage collector module 48 may be configured to determine whether an object is required in an execution procedure of the web application. The garbage collector module 48 may further be configured to free up space within the memory 24 corresponding to the object by deallocating the object from, for example, the nursery heap 40, mature heap 44 and/or one or more private nurseries 46(1)-46(n) of the spawned thread nursery database 44 during a garbage collection cycle. Generally, a garbage collection cycle refers to period during which the garbage collection module 48 performs garbage collection. As described in greater detail herein, a garbage collection cycle may be determined based on a state of execution of each of the threads of the web application. More specifically, the initiation of a garbage collection cycle by the garbage collector module 48 is dependent upon an identified state of execution of each thread, described in greater detail herein During execution of one or more spawned threads 38(1)-38(n), the distinguished main thread 36 may remain dormant. During execution of one or more spawned threads 38(1)-38(n), each of the spawned threads 38(1)-38(n) may access and allocate one or more objects to an associated empty private nursery 46(1)-46(n). When created, such objects are considered thread local. As previously described, the memory 24 is configured as shared memory. As such, a spawned thread 38 is unable to publish one or more objects from an associated private nursery 46 by installing a pointer (e.g., reference(s) indicated location of the object in the memory 24) in an area of memory 24 visible to other spawned threads 38. This maintains the invariant that spawned threads are unable to access values being manipulated by spawned siblings. Upon completion of execution, a spawned thread 38 may return a newly allocated object to either the main thread 36 or potentially to another spawned thread. In either event, such object will be stored in the associated private nursery 46. In some instances, upon completion, the associated private nursery 46 may have additional space available and may be referred to as partially used private nursery.

If, during execution, a spawned thread 38 runs out of available space in an associated private nursery 46 and requires additional memory space, the spawned thread 38 may be configured to request additional memory blocks to expand the associated private nursery 46. The spawned thread 38 may also be configured to request access to a partially used private nursery from the spawned thread nursery database 44. For example, in the event that private nursery 46(1) associated with spawned thread 38(1) runs out of available space, the spawned thread 38(1) may request and gain access to a partially used private nursery, such as, for example, private nursery 46(2), in order to continue thread execution. If the request is successful, the spawned thread 38(1) may gain access to and continue allocating one or more objects in the remaining available memory space of a partially used private nursery 46(2). In the event that a partially used private nursery is not available, the spawned thread 38 may remain dormant at least until another spawned thread completes execution and provides a partially used private nursery or until all non-completed spawned threads are dormant at an allocation.

Generally, each of the spawned threads 38(1)-38(n) may have at least one state of execution. The states of execution may include a running state, a dormant state and a completed state. Depending upon the current state of execution of one or more spawned threads 38(1)-38(n), the garbage collector module 48 may be configured to initiate a garbage collection cycle. For example, in one embodiment, on order to initiate a garbage collection cycle, all of the spawned threads 38(1)-38(n) must reach a safe point. A safe point for a thread is a point in the thread's execution in which the thread's stack can be accurately scanned for pointers and garbage collection is safe. A spawned thread's current state of execution is indicative of whether the thread has reached a safe point. For example, if a spawned thread is dormant or has completed execution, then the spawned thread has reached a safe point. If a spawned thread is running (i.e., not complete nor dormant and is making progress) then the system is making progress and the spawned thread has not reached a safe point. Accordingly, if all spawned threads 38(1)-38(n) are dormant or complete, then all spawned threads 38(1)-38(n) have reached safe points and the garbage collector module 48 can initiate garbage collection. If one or more spawned threads 38(1)-38(n) are running, then the running spawned threads have not reached safe points and the garbage collector module 48 does not initiate garbage collection.

Eventually, all spawned threads 38(1)-38(n) will inevitably reach a safe point. Once all spawned threads complete and before the dormant main thread is resumed, the private nurseries 46(1)-46(n) from the spawned thread nursery database 44 are placed on the nursery heap 40, wherein, during the next garbage collection cycle, the main thread's nursery and the spawned threads' private nurseries may be treated simply as nurseries for purposes the garbage collection.

Since spawned threads cannot see the work of sibling spawned threads, spawned threads cannot be dependent on another spawned thread and will not block if a sibling thread becomes dormant. If there are no spawned threads, then the main thread is free to make progress. As such, at least one thread is free to execute at all times, thereby ensuring that the system will always make forward progress.

The garbage collector module 48 may be configured to perform garbage collection on the private nurseries 46(1)-46(n) as well as the nursery heap 40 by one or more garbage collection methods generally understood by one skilled in the art. The garbage collector module 48 may be configured to detect one or more memory blocks corresponding to associated allocated objects and determine whether the associated allocated objects will be accessed in the future. If it is determined that an object is not required in an execution procedure of the web application, the garbage collector module 48 may be configured to deallocate (e.g., remove) the object from the memory and thereby free up more available memory for future allocations. It should be noted that the garbage collector module 48 may be configured to perform a nursery-only garbage collection and a global garbage collection. In a nursery-only garbage collection, the garbage collector module 48 is configured to perform garbage collection on at least the private nurseries 46(1)-46(n). In the global garbage collection, the garbage collector module 48 is configured perform garbage collection in the nursery heap 40 and private nurseries 46(1)-46(n) as well as the mature heap 42. In the illustrated embodiment, since allocation into global areas (e.g., nursery heap 40, mature space 42) is suspended while spawned threads are running, there is no need to collect the global area while any local area (e.g., private nurseries 46(1)-46(n)) holds objects.

Figure 4:
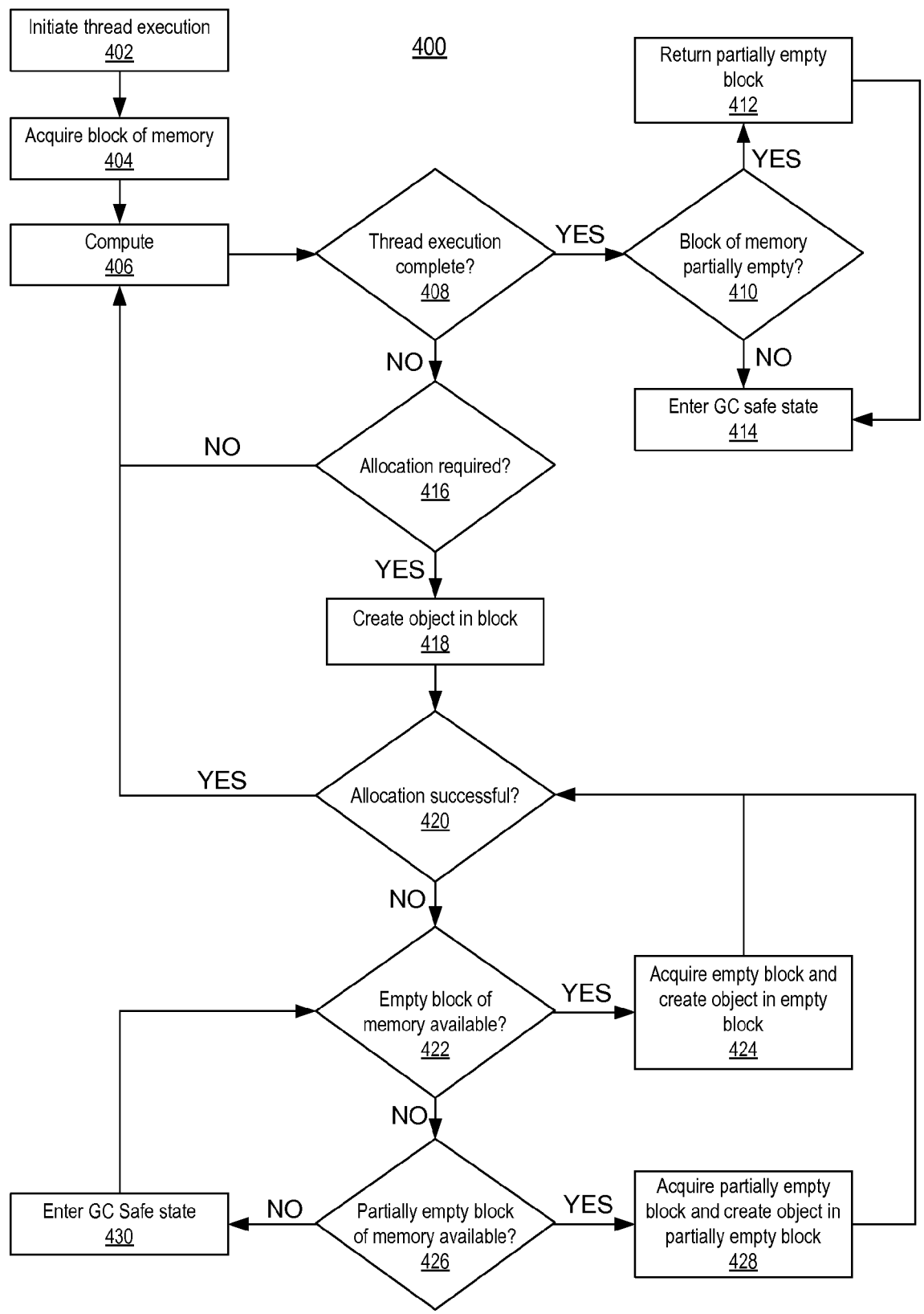
FIG. 4 is a flowchart of example operations in accordance with at least one embodiment of the present disclosure.

FIG. 4 is a flowchart of example operations in accordance with at least one embodiment consistent with the present disclosure. In operation 402 execution of a thread (e.g. spawned thread) of an application (e.g., in-browser web application) may be initiated. Initiation of execution of the thread may be followed by the acquisition of a block of memory in operation 404. The block of memory may include a private nursery (e.g., private nursery 46(1)-46(n)) from a nursery database (e.g., spawned thread nursery database 44) in which the spawned thread may access during thread execution. In operation 406, computation of the thread execution occurs.

A determination may then be made in operation 408 as to whether execution of the thread is complete. If it is determined in operation 408 that the execution is complete, a determination may then be made in operation 410 as to whether the block of memory is partially empty. If it is determined in operation 410 that the block of memory is partially empty, then the partially empty block of memory is returned in operation 412 and the thread may enter a garbage collection (GC) safe state in operation 414. Otherwise, the thread may enter the GC safe state in operation 414. A GC safe state is a point in the thread's execution in which garbage collection of the memory block is safe to occur.

If it is determined in operation 408 that the execution of the thread is incomplete, a determination may then be made in operation 416 as to whether allocation in the block of memory is required. If it is determined in operation 416 that allocation is required, then an object is created in a portion of the block of memory in operation 418. Otherwise, if it is determined in operation 416 that allocation is not required, then operations 406-408 may repeat.

Upon creating an object in a portion of the block memory in operation 418, a determination may then be made in operation 420 as to whether allocation by the thread was successful. If it is determined in operation 420 that allocation was successful, then operations 406-408 may repeat. Otherwise, if it is determined in operation 420 that allocation was unsuccessful, a determination may be made in operation 422 as to whether an empty block of memory is available. The initial block of memory may run out of available memory space and the thread may require additional memory space in order to complete the allocation. If it is determined in operation 422 that an additional empty block of memory is available, then the additional empty block of memory is acquired and allocation in the additional empty block of memory occurs, wherein an object is created in the additional empty block of memory in operation 424 and operation 420 may repeat.

If it is determined in operation 422 that an additional empty block of memory is unavailable, then a determination may be made in operation 426 as to whether a partially empty block of memory is available. For example, the thread may be configured to request access to a partially used memory block (e.g., partially used private nursery from the spawned thread nursery database 44). If it is determined in operation 426 that a partially empty block of memory is available, then the partially empty block of memory is acquired and allocation in the partially empty block of memory occurs, wherein an object is created in the remaining available space in the partially used block of memory in operation 428 and operation 420 may repeat. Otherwise, if it is determined that a partially empty block of memory is unavailable, then the thread may enter a GC safe state in operation 430 and operation 422 may repeat.

While FIG. 4 illustrates various operations according to an embodiment, it is to be understood that not all of the operations depicted in FIG. 4 are necessary for other embodiments. Indeed, it is fully contemplated herein that in other embodiments of the present disclosure, the operations depicted in FIG. 4 and/or other operations described herein may be combined in a manner not specifically shown in any of the drawings, but still fully consistent with the present disclosure. Thus, claims directed to features and/or operations that are not exactly shown in one drawing are deemed within the scope and content of the present disclosure.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

According to one aspect, there is provided an apparatus for automatic memory management for parallel computing of a web application. The apparatus includes a processor has at least two computer processing unit (CPU) cores and an operating system configured to assign one or more threads of a processing function of a web application to corresponding CPU cores of the processor for concurrent execution on the corresponding CPU cores. The one or more threads include a first thread and at least one spawned thread.

The computing system further includes memory has a set of blocks distributed to the first thread and the at least one spawned thread. The memory is partitioned into a nursery heap, a mature heap and a database has a plurality of private nurseries. The first thread has access to the nursery heap and mature heap. The first thread is configured to allocate and manipulate one or more objects in the nursery heap and write references to one or more objects stored in the nursery and mature heaps. The at least one spawned thread has access to an associated one of the plurality of private nurseries. The at least one spawned thread is configured to allocate and manipulate one or more objects within the associated private nursery.

Another example apparatus includes the foregoing components and further includes a web browser configured to execute the web application. The web application is coded in a scripting language supported by the web browser.

Another example apparatus includes the foregoing components and the scripting language is JavaScript®.

Another example apparatus includes the foregoing components and further includes a programming language engine configured to interpret and execute the web application code within a runtime system of the web browser.

Another example apparatus includes the foregoing components and further includes a deterministic parallel programming module configured to modify the programming language engine and to extend programming language with deterministic data-parallel constructs translated at runtime into a low-level hardware abstractions layer to enable data-parallelism for the web application.

Another example apparatus includes the foregoing components and further includes a memory management module configured to monitor execution of at least the first thread and the at least one spawned thread and manage life cycles of one or more objects allocated and stored within the sets of blocks of the memory.

Another example apparatus includes the foregoing components and the memory management module includes a garbage collector module configured to perform garbage collection on at least each of the plurality of private nurseries during a garbage collection cycle.

Another example apparatus includes the foregoing components and the garbage collector module is configured to initiate the garbage collection cycle based, at least in part, on a state of execution of the at least one spawned thread, the state of execution determinative of whether the at least one spawned thread reaches a safe point.

Another example apparatus includes the foregoing components and the state of execution is selected from the group consisting of running, dormant and complete.

Another example apparatus includes the foregoing components and the at least one spawned thread reaches a safe point when the state of execution is dormant or complete and fails to reach a safe point when the state of execution is running.

Another example apparatus includes the foregoing components and if the associated one of the plurality of private nurseries has insufficient memory space for the at least one spawned thread to complete allocation of one or more objects, the at least one spawned thread is configured to request access to a previously used private nursery from the plurality of private nurseries. The previously used private nursery has a portion of memory space available for the at least one spawned thread to allocate one or more objects.

According to one aspect, there is provided a system for automatic memory management for parallel computing of a web application. The system includes a media source and a client device configured to communicate with the media source over a network and to access and execute a web application provided by the media source. The client device includes a computing system configured to allow parallel computing of the web application.

The computing system includes a processor has at least two computer processing unit (CPU) cores and an operating system configured to assign one or more threads of a processing function of a web application to corresponding CPU cores of the processor for concurrent execution on the corresponding CPU cores. The one or more threads include a first thread and at least one spawned thread.

The computing system further includes memory has a set of blocks distributed to the first thread and the at least one spawned thread. The memory is partitioned into a nursery heap, a mature heap and a database has a plurality of private nurseries. The first thread has access to the nursery heap and mature heap. The first thread is configured to allocate and manipulate one or more objects in the nursery heap and write references to one or more objects stored in the nursery and mature heaps. The at least one spawned thread has access to an associated one of the plurality of private nurseries. The at least one spawned thread is configured to allocate and manipulate one or more objects within the associated private nursery.

Another example system includes the foregoing components and further includes a web browser configured to execute the web application. The web application is coded in a scripting language supported by the web browser.

Another example system includes the foregoing components and further includes a programming language engine configured to interpret and execute the web application code within a runtime system of the web browser and a deterministic parallel programming module configured to modify the programming language engine and to extend programming language with deterministic data-parallel constructs translated at runtime into a low-level hardware abstractions layer to enable data-parallelism for the web application.

Another example system includes the foregoing components and further includes a memory management module configured to monitor execution of at least the first thread and the at least one spawned thread and manage life cycles of one or more objects allocated and stored within the sets of blocks of the memory and a garbage collector module configured to perform garbage collection on at least each of the plurality of private nurseries during a garbage collection cycle.

Another example system includes the foregoing components and the garbage collector module is configured to initiate the garbage collection cycle based, at least in part, on a state of execution of the at least one spawned thread. The state of execution is determinative of whether the at least one spawned thread reaches a safe point. The state of execution is selected from the group consisting of running, dormant and complete.

Another example system includes the foregoing components and if the associated one of the plurality of private nurseries has insufficient memory space for the at least one spawned thread to complete allocation of one or more objects, the at least one spawned thread is configured to request access to a previously used private nursery from the plurality of private nurseries. The previously used private nursery has a portion of memory space available for the at least one spawned thread to allocate one or more objects.

According to another aspect, there is provided at least one computer accessible medium including instructions stored thereon. When executed by one or more processors, the instructions may cause a computer system to perform operations for automatic memory management for parallel computing of a web application. The operations include initiating concurrent execution of one or more threads of a processing function of a web application on corresponding CPU cores of a processor. The one or more threads include a first thread and at least one spawned thread. The operations further include acquiring associated blocks in a shared memory distributed to the first thread and the at least one spawned thread, the blocks include a nursery heap, a mature heap and a database having a plurality of private nurseries. The first thread has access to and is configured to allocate and manipulate one or more objects within the nursery heap and mature heap. The at least one spawned thread has access to and is configured to allocate and manipulate one or more objects within an associated one of the plurality of private nurseries. The operations further include monitoring execution of at least the first thread and the at least one spawned thread and managing life cycles of one or more objects allocated and stored within the nursery heap, mature heap and each of the plurality of nurseries of the memory.

Another example computer accessible medium includes the foregoing operations and further includes performing garbage collection on at least the plurality of private nurseries during initiation of a garbage collection cycle.

Another example computer accessible medium includes the foregoing operations and the garbage collection cycle is based, at least in part, on a state of execution of the at least one spawned thread, the state of execution determinative of whether the at least one spawned thread reaches a safe point, wherein the state of execution is selected from the group consisting of running, dormant and complete.

Another example computer accessible medium includes the foregoing operations and further includes determining the associated one of the plurality of private nurseries has insufficient memory space for the at least one spawned thread to complete allocation of one or more objects, identifying a previously used private nursery from the plurality of private nurseries having a portion of memory space available for the at least one spawned thread to allocate one or more objects and accessing the previously used private nursery and allocating one or more objects within the portion of available memory space.

According to another aspect, there is provided a method for automatic memory management for parallel computing of a web application. The method includes initiating concurrent execution of one or more threads of a processing function of a web application on corresponding CPU cores of a processor. The one or more threads include a first thread and at least one spawned thread. The method further includes acquiring associated blocks in a shared memory distributed to the first thread and the at least one spawned thread, the blocks include a nursery heap, a mature heap and a database having a plurality of private nurseries. The first thread has access to and is configured to allocate and manipulate one or more objects within the nursery heap and mature heap. The at least one spawned thread has access to and is configured to allocate and manipulate one or more objects within an associated one of the plurality of private nurseries. The method further includes monitoring execution of at least the first thread and the at least one spawned thread and managing life cycles of one or more objects allocated and stored within the nursery heap, mature heap and each of the plurality of nurseries of the memory.

Another example method includes the foregoing operations and further includes performing garbage collection on at least the plurality of private nurseries during initiation of a garbage collection cycle.

Another example method includes the foregoing operations and the garbage collection cycle is based, at least in part, on a state of execution of the at least one spawned thread, the state of execution determinative of whether the at least one spawned thread reaches a safe point, wherein the state of execution is selected from the group consisting of running, dormant and complete.

Another example method includes the foregoing operations and further includes determining the associated one of the plurality of private nurseries has insufficient memory space for the at least one spawned thread to complete allocation of one or more objects, identifying a previously used private nursery from the plurality of private nurseries having a portion of memory space available for the at least one spawned thread to allocate one or more objects and accessing the previously used private nursery and allocating one or more objects within the portion of available memory space.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus for automatic memory management for parallel computing of a web application, said apparatus comprising:
    a processor having at least two computer processing unit (CPU) cores;
    an operating system configured to assign one or more threads of a processing function of a web application to corresponding CPU cores of said processor for concurrent execution on said corresponding CPU cores, said one or more threads comprise a first thread and at least one spawned thread;
    memory having a set of blocks distributed to said first thread and said at least one spawned thread, said memory being partitioned into a nursery heap, a mature heap and a database having a plurality of private nurseries;
    wherein said first thread has access to said nursery heap and mature heap, said first thread being configured to allocate and manipulate one or more objects in said nursery heap and write references to one or more objects stored in said nursery and mature heaps;
    wherein said at least one spawned thread has access to an associated one of said plurality of private nurseries, said at least one spawned thread being configured to allocate and manipulate one or more objects within said associated private nursery; and
    wherein, if said associated one of said plurality of private nurseries has insufficient memory space for said at least one spawned thread to complete allocation of one or more objects, said at least one spawned thread is configured to:
        request access to an empty private nursery from said plurality of private nurseries, if available; and
        when said empty private nursery is not available, request access to only an unused portion of memory space of a previously used private nursery from said plurality of private nurseries to allocate one or more objects.

2. The apparatus of claim 1, further comprising a web browser configured to execute said web application, wherein said web application is coded in a scripting language supported by said web browser.

3. The apparatus of claim 2, wherein said scripting language is JavaScript®.

4. The apparatus of claim 2, further comprising a programming language engine configured to interpret and execute said web application code within a runtime system of said web browser.

5. The apparatus of claim 4, further comprising a deterministic parallel programming module configured to modify said programming language engine and to extend programming language with deterministic data-parallel constructs translated at runtime into a low-level hardware abstractions layer to enable data-parallelism for said web application.

6. The apparatus of claim 1, further comprising a memory management module configured to monitor execution of at least said first thread and said at least one spawned thread and manage life cycles of one or more objects allocated and stored within said sets of blocks of said memory.

7. The apparatus of claim 6, wherein said memory management module comprises a garbage collector module configured to perform garbage collection on at least said plurality of private nurseries during a garbage collection cycle.

8. The apparatus of claim 7, wherein said garbage collector module is configured to initiate said garbage collection cycle based, at least in part, on a state of execution of said at least one spawned thread, said state of execution determinative of whether said at least one spawned thread reaches a safe point.

9. The apparatus of claim 8, wherein said state of execution is selected from the group consisting of running, dormant and complete.

10. The apparatus of claim 9, wherein said at least one spawned thread reaches a safe point when said state of execution is dormant or complete and fails to reach a safe point when said state of execution is running.

11. A system for automatic memory management for parallel computing of a web application, said system comprising:
    a media source; and
    a client device configured to communicate with said media source over a network and access and execute a web application provided by said media source, said client device having a computing system configured to allow parallel computing of said web application, said computing system comprising:
        a processor having at least two computer processing unit (CPU) cores;
        an operating system configured to assign one or more threads of a processing function of said web application to corresponding CPU cores of said processor for concurrent execution on said corresponding CPU cores, said one or more threads comprise a first thread and at least one spawned thread;
        memory having a set of blocks distributed to said first thread and said at least one spawned thread, said memory being partitioned into a nursery heap, a mature heap and a database having a plurality of private nurseries;
        wherein said first thread has access to said nursery heap and mature heap, said first thread being configured to allocate and manipulate one or more objects in said nursery heap and write references to one or more objects stored in said nursery and mature heaps;

wherein said at least one spawned thread has access to an associated one of said plurality of private nurseries, said at least one spawned thread being configured to allocate and manipulate one or more objects within said associated private nursery; and wherein, if said associated one of said plurality of private nurseries has insufficient memory space for said at least one spawned thread to complete allocation of one or more objects, said at least one spawned thread is configured to:

request access to an empty private nursery from said plurality of private nurseries, if available; and when said empty private nursery is not available, request access to only an unused portion of memory space of a previously used private nursery from said plurality of private nurseries to allocate one or more objects.

12. The system of claim 11, further comprising a web browser configured to execute said web application, wherein said web application is coded in a scripting language supported by said web browser.

13. The system of claim 12, further comprising:
a programming language engine configured to interpret and execute said web application code within a runtime system of said web browser; and
a deterministic parallel programming module configured to modify said programming language engine and to extend programming language with deterministic data-parallel constructs translated at runtime into a low-level hardware abstractions layer to enable data-parallelism for said web application.

14. The system of claim 11, further comprising:
a memory management module configured to monitor execution of at least said first thread and said at least one spawned thread and manage life cycles of one or more objects allocated and stored within said sets of blocks of said memory; and
a garbage collector module configured to perform garbage collection on at least said plurality of private nurseries during a garbage collection cycle.

15. The system of claim 14, wherein said garbage collector module is configured to initiate said garbage collection cycle based, at least in part, on a state of execution of said at least one spawned thread, said state of execution determinative of whether said at least one spawned thread reaches a safe point, wherein said state of execution is selected from the group consisting of running, dormant and complete.

16. At least one non-transitory computer accessible medium storing instructions which, when executed by a machine, cause the machine to perform operations for automatic memory management for parallel computing of a web application, said operations comprising:

initiating concurrent execution of one or more threads of a processing function of a web application on corresponding CPU cores of a processor, said one or more threads comprise a first thread and at least one spawned thread;

acquiring associated blocks in a shared memory distributed to said first thread and said at least one spawned thread, said blocks comprising a nursery heap, a mature heap and a database having a plurality of private nurseries, wherein said first thread has access to and is configured to allocate and manipulate one or more objects within said nursery heap and mature heap and said at least one spawned thread has access to and is configured to allocate and manipulate one or more objects within an associated one of said plurality of private nurseries;

monitoring execution of at least said first thread and said at least one spawned thread and managing life cycles of one or more objects allocated and stored within said nursery heap, mature heap and each of said plurality of nurseries of said memory;

determining said associated one of said plurality of private nurseries has insufficient memory space for said at least one spawned thread to complete allocation of one or more objects;

accessing to an empty private nursery from said plurality of private nurseries, if available;

when said empty private nursery is not available, identifying a previously used private nursery from said plurality of private nurseries having a portion of memory space available for said at least one spawned thread to allocate one or more objects; and accessing only an unused portion of available memory space of said previously used private nursery and allocating one or more objects within said unused portion of available memory space.

17. The non-transitory computer accessible medium of claim 16, further comprising:
performing garbage collection on at least said plurality of private nurseries during initiation of a garbage collection cycle.

18. The non-transitory computer accessible medium of claim 17, wherein said garbage collection cycle is based, at least in part, on a state of execution of said at least one spawned thread, said state of execution determinative of whether said at least one spawned thread reaches a safe point, wherein said state of execution is selected from the group consisting of running, dormant and complete.

19. A method for automatic memory management for parallel computing of a web application, said method comprising:

initiating concurrent execution of one or more threads of a processing function of a web application on corresponding CPU cores of a processor, said one or more threads comprising a first thread and at least one spawned thread;

acquiring associated blocks in a shared memory distributed to said first thread and said at least one spawned thread, said blocks comprising a nursery heap, a mature heap and a database having a plurality of private nurseries, wherein said first thread has access to and is configured to allocate and manipulate one or more objects within said nursery heap and mature heap and said at least one spawned thread has access to and is configured to allocate and manipulate one or more objects within an associated one of said plurality of private nurseries;

monitoring execution of at least said first thread and said at least one spawned thread and managing life cycles of one or more objects allocated and stored within said nursery heap, mature heap and each of said plurality of nurseries of said memory;

determining said associated one of said plurality of private nurseries has insufficient memory space for said at least one spawned thread to complete allocation of one or more objects;

accessing to an empty private nursery from said plurality of private nurseries, if available;

when said empty private nursery is not available, identifying a previously used private nursery from said plurality of private nurseries having a portion of memory space available for said at least one spawned thread to allocate one or more objects; and accessing only an unused portion of available memory space of said previously used private nursery and allocating one or more objects within said unused portion of available memory space.

20. The method of claim 19, further comprising:
performing garbage collection on at least said plurality of private nurseries during initiation of a garbage collection cycle.

21. The method of claim 20, wherein said garbage collection cycle is based, at least in part, on a state of execution of said at least one spawned thread, said state of execution determinative of whether said at least one spawned thread reaches a safe point, wherein said state of execution is selected from the group consisting of running, dormant and complete.

* * * * *